US007700187B2

United States Patent
Konrad et al.

(10) Patent No.: US 7,700,187 B2
(45) Date of Patent: Apr. 20, 2010

(54) POLYESTER FILM WITH HYDROPHILIC COATING

(75) Inventors: Matthias Konrad, Hofheim (DE); Herbert Peiffer, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 11/545,283

(22) Filed: Oct. 10, 2006

(65) Prior Publication Data

US 2007/0087188 A1 Apr. 19, 2007

(30) Foreign Application Priority Data

Oct. 18, 2005 (DE) .................... 10 2005 049 639

(51) Int. Cl.
*B32B 27/06* (2006.01)
*B32B 27/08* (2006.01)
*B32B 27/18* (2006.01)
*B32B 27/36* (2006.01)
*B32B 37/15* (2006.01)

(52) U.S. Cl. .................... 428/336; 428/334; 428/339; 428/480; 264/173.6; 264/288.4; 264/289.3; 264/289.6; 264/290.2; 528/293; 528/294; 528/295; 528/308; 528/308.6

(58) Field of Classification Search .................... None
See application file for complete search history.

(56) References Cited

U.S. PATENT DOCUMENTS

| 3,563,942 | A | * | 2/1971 | Heiberger .................... 524/602 |
| 3,734,874 | A | * | 5/1973 | Kibler et al. .................. 524/603 |
| 3,779,993 | A | * | 12/1973 | Kibler et al. .................. 528/295 |
| 4,244,988 | A | * | 1/1981 | Dodwell .................... 427/173 |
| 4,252,885 | A | * | 2/1981 | McGrail et al. ............. 430/160 |
| 4,409,285 | A | * | 10/1983 | Swerdlow .................... 428/332 |
| 4,478,907 | A | * | 10/1984 | Van Gossum et al. ....... 428/327 |
| 4,585,687 | A | * | 4/1986 | Posey et al. ............... 428/195.1 |
| 4,605,591 | A | * | 8/1986 | Nose et al. .................... 428/332 |
| 4,699,845 | A | * | 10/1987 | Oikawa et al. .............. 428/480 |
| 4,845,189 | A | * | 7/1989 | Rudd et al. .................. 528/272 |
| 4,857,396 | A | * | 8/1989 | Otonari et al. ........... 428/315.5 |
| 4,880,700 | A | * | 11/1989 | Charmot et al. ............. 428/337 |
| 4,908,277 | A | * | 3/1990 | Tsunashima et al. ........ 428/480 |

(Continued)

FOREIGN PATENT DOCUMENTS

DE 100 35 328 A1 1/2002

(Continued)

OTHER PUBLICATIONS

Schimtz, Peter et al., "Films." Ullmann'S Encyclopedia of Industrial Chemistry, 5th Ed., vol. A11 (1988), pp. 85-95, 105-106, 108-110.*

(Continued)

*Primary Examiner*—Vivian Chen
(74) *Attorney, Agent, or Firm*—ProPat, L.L.C.

(57) ABSTRACT

The invention relates to a biaxially oriented polyester film, preferably PET film, which has a hydrophilic coating on at least one surface. The coating composition used to form the hydrophilic coating includes water, a sulfopolyester, a surfactant, and optionally an adhesion-promoting polymer. The inventive films have a hydrophilic surface which inhibit condensation of water droplets on the films.

24 Claims, 1 Drawing Sheet

U.S. PATENT DOCUMENTS

Figure 1:
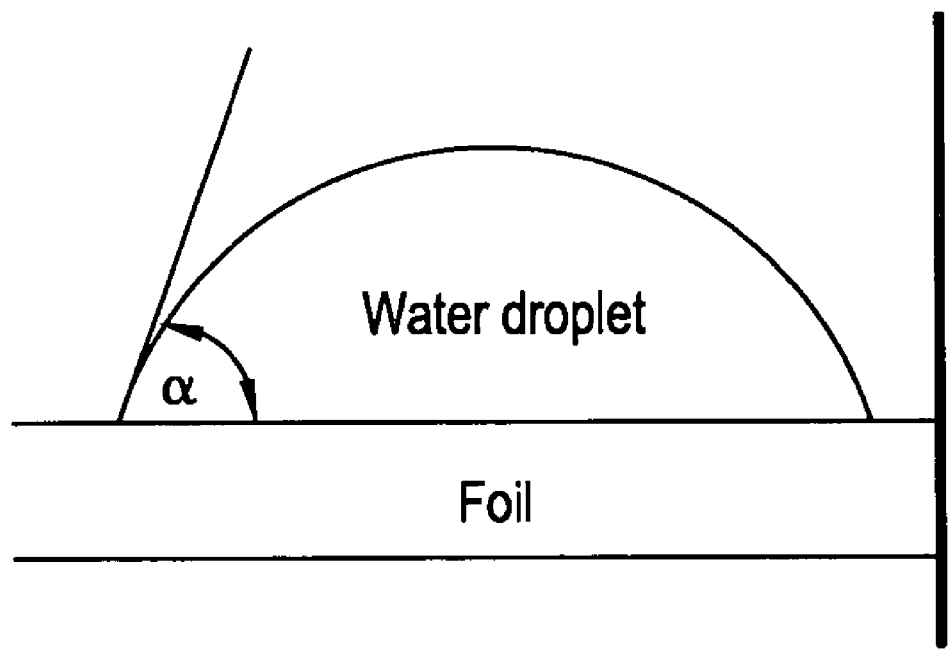

| | | | |
|---|---|---|---|
| 4,921,764 A * | 5/1990 | Rudd et al. | 428/480 |
| 4,978,740 A * | 12/1990 | Kawamoto et al. | 528/272 |
| 5,073,435 A * | 12/1991 | Eyraud et al. | 428/215 |
| 5,218,032 A * | 6/1993 | Sharma | 524/379 |
| 5,262,224 A * | 11/1993 | Ozaki et al. | 428/195.1 |
| 5,262,233 A * | 11/1993 | Sudo et al. | 428/327 |
| 5,268,420 A * | 12/1993 | Nishimura et al. | 524/857 |
| 5,294,650 A * | 3/1994 | Sharma | 523/523 |
| 5,328,770 A * | 7/1994 | Yoshida et al. | 428/480 |
| 5,391,429 A * | 2/1995 | Otani et al. | 428/327 |
| 5,476,707 A * | 12/1995 | Fiard et al. | 428/141 |
| 5,540,974 A * | 7/1996 | Hoseki et al. | 428/141 |
| 5,562,997 A * | 10/1996 | Krejci et al. | 428/480 |
| 5,763,096 A * | 6/1998 | Takahashi et al. | 428/480 |
| 5,910,359 A * | 6/1999 | Kobayashi et al. | 428/32.15 |
| 5,958,552 A | 9/1999 | Fukuda et al. | 428/141 |
| 5,958,659 A * | 9/1999 | Takahashi | 430/533 |
| 5,985,437 A * | 11/1999 | Chappell et al. | 428/336 |
| 6,060,156 A * | 5/2000 | Chappell et al. | 428/323 |
| 6,103,368 A * | 8/2000 | Fukuda et al. | 428/337 |
| 6,120,868 A * | 9/2000 | Heberger et al. | 428/41.4 |
| 6,165,602 A * | 12/2000 | Fujita | 428/216 |
| 6,200,511 B1 * | 3/2001 | Peiffer et al. | 264/176.1 |
| 6,214,440 B1 * | 4/2001 | Peiffer et al. | 428/141 |
| 6,214,530 B1 * | 4/2001 | Morrison et al. | 430/527 |
| 6,455,142 B1 * | 9/2002 | Heberger et al. | 428/215 |
| 6,517,932 B1 * | 2/2003 | Peiffer et al. | 428/216 |
| 6,607,823 B2 * | 8/2003 | Posey et al. | 428/336 |
| 6,645,615 B2 * | 11/2003 | Heberger et al. | 428/336 |
| 6,921,580 B2 * | 7/2005 | Akatsu et al. | 428/480 |
| 6,946,498 B2 * | 9/2005 | Kayanoki | 522/99 |
| 7,015,262 B2 * | 3/2006 | Leong | 523/205 |
| 7,211,309 B2 * | 5/2007 | Kitazawa et al. | 428/41.7 |
| 2002/0110685 A1 * | 8/2002 | Ebihara et al. | 428/336 |
| 2002/0127414 A1 * | 9/2002 | Peiffer et al. | 428/447 |
| 2003/0207987 A1 | 11/2003 | Leong | 524/601 |
| 2004/0014883 A1 * | 1/2004 | Yamamoto et al. | 524/599 |
| 2006/0078718 A1 * | 4/2006 | Konrad et al. | 428/220 |

FOREIGN PATENT DOCUMENTS

| | | |
|---|---|---|
| DE | 10 2004 049 609 A1 | 4/2006 |
| EP | 0 322 529 A1 | 7/1989 |
| EP | 1 358 896 A1 | 11/2003 |
| JP | 09-314779 * | 12/1997 |
| JP | 10-017818 * | 1/1998 |
| WO | WO 99/28373 * | 6/1999 |
| WO | WO 02/074535 A1 | 9/2002 |

OTHER PUBLICATIONS

Encyclopedia of Polymer Science and Engineering, vol. 12, John Wiley & Sons, 1988.

* cited by examiner

POLYESTER FILM WITH HYDROPHILIC COATING

CROSS-REFERENCE TO RELATED APPLICATIONS

This application claims priority to its parent application, German Patent Application 10 2005 049 639.3, filed Oct. 18, 2005, which is hereby incorporated by reference herein, in its entirety.

FIELD OF THE INVENTION

The invention relates to a biaxially oriented polyester film with hydrophilic coating which comprises a sulfopolyester, a surfactant, and optionally an adhesion-promoting polymer. The coating is preferably applied in-line, i.e. during film production. The coated film features a characteristic hydrophilic surface which inhibits condensation of water droplets on the film ("antifog coating").

BACKGROUND OF THE INVENTION

In the packaging industry there is a high level of demand for transparent biaxially oriented polyester film. If polyester film is used to pack foods which are fresh and are highly perishable a possible consequence especially in the case of refrigerated goods is undesired condensation on the film and resultant impairment of transparency, when moisture from the packaged product condenses in the form of droplets, usually of various sizes, on the film. The condensate here markedly impairs the transparency of the film. A hydrophilic coating, also termed an antifog coating, can be used to inhibit transparency reduction on the film.

Various technologies can be used to achieve antifog properties on plastics surfaces. A first idea uses addition of an additive to the polymer, and secondly an antifog coating can be applied to the film. Addition of an additive to the polymer is possible in articles comprised of polyolefin, in particular films (e.g. WO 2002/074535). The antifog action on the film surface is based on the migration of the additive, usually an amphiphilic molecule, to the surface, the result being that the polar ends of the molecules form the actual antifog layer. This principle cannot be applied to a polyester film because the polyester is highly polar.

EP 322 529 describes a copolyester coating inter alia for polyesters, comprising up to 95% of isophthalic acid and from 5 to 35% of a monomer having an alkali metal sulfonate group. The coating is used as adhesion promoter with respect to vapor-deposited metals. Nothing is said about surface tension of the coated film or about behavior with respect to water condensation.

EP 1 358 896 describes a coating for a needle which comprises a sulfonated polyester and comprises a surfactant. In the examples, these two components are mixed in a ratio of about 10:1 and applied by means of a dipping process to the substrate. The contact angles of the coated substrates with respect to water are smaller than 10°, i.e. surface tension is greater than 70 mN/m. Nothing is said about the thickness of the coating.

DE-A-10 2004 049 609 describes a coating which comprises polyvinylpyrrolidone, a surfactant, and optionally an adhesion-promoting polymer. This composition is suitable for the in-line coating of biaxially oriented polyester films. The resultant coated films feature a characteristic hydrophilic surface which inhibits condensation of water droplets on the film. The optical quality of the coated film requires improvement. The coating increases the haze of the film, and this is undesirable particularly in the case of high-transparency films.

SUMMARY OF ADVANTAGEOUS EMBODIMENTS OF THE INVENTION

It was an object of the present invention to provide a biaxially oriented polyester film which has a hydrophilic coating and whose coating is preferably applied in-line during the production of the polyester film, i.e. preferably prior to the second stretching step. The resultant coated polyester film should have a high level of hydrophilic properties and good antifog action.

DETAILED DESCRIPTION OF THE DRAWINGS

FIG. 1 schematically illustrates the contact angle with respect to water.

DETAILED DESCRIPTION OF ADVANTAGEOUS EMBODIMENTS OF THE INVENTION

The invention achieves the object via provision of a coated polyester film which is produced with the use of a coating composition which comprises the following components alongside water:
a) a sulfopolyester,
b) a surfactant, and optionally
c) a polymer (adhesion-promoting polymer) which improves the coupling of the other components to the polyester surface.

The total concentration of all of the components a) to c) in water is preferably in the range from 1 to 8% by weight. Unless otherwise stated, all amounts stated are in percent by weight.

The sulfopolyester is comprised of the condensate of the following monomers or their derivatives capable of forming polyesters:
A) up to 95 mol % of isophthalic acid,
B) from 5 to 20 mol % of at least one sulfomonomer containing an alkali metal sulfonate group on the aromatic moiety of an aromatic dicarboxylic acid, and
C) the necessary stoichiometric amount of at least one copolymerizable aliphatic or cycloaliphatic glycol having from 2 to 11 carbon atoms to form 100 mol % of condensate, where each of the percentages given is based on the total amount of the monomer forming the sulfopolyester.

The concentration of the sulfopolyester in the finished coating mixture or finished coating dispersion is preferably from 0.1 to 2.5% by weight, in particular from 0.3 to 2% by weight.

Examples of sulfomonomers which contain a metal sulfonate group on the aromatic moiety of an aromatic dicarboxylic acid (component B) are those monomers complying with the following formula:

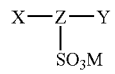

In this formula:

M is a monovalent cation of an alkali metal,

Z is a trivalent aromatic radical, and

X and Y are carboxy groups or derivatives capable of forming polyesters.

U.S. Pat. Nos. 3,563,942 and 3,779,993 describe monomers of this type. Examples of these monomers are the sodium salt of sulfoterephthalic acid, the sodium salt of 5-sulfoisophthalic acid, the sodium salt of sulfophthalic acid, the sodium salt of 5-(p-sulfophenoxy)isophthalic acid, the sodium salt of 5-(sulfopropoxy)isophthalic acid, and similar monomers, and also their derivatives capable of forming polyesters, e.g. the dimethyl esters. M is preferably Na, Li, or K as cation. The expression "derivatives capable of forming polyesters" here means reactants having groups capable of condensation reactions, in particular transesterification reactions, to form polyester bonds. Among these groups are carboxy groups, and also lower alkyl esters thereof, examples being dimethyl terephthalate, diethyl terephthalate, and numerous other corresponding esters, halides, or salts. The acid monomers are preferably used in the form of dimethyl esters, because the condensation reaction can be better controlled in this way.

Examples of glycols suitable as component C are ethylene glycol, 2-methyl-1,3-propanediol, 1,5-pentanediol, 1,6-hexanediol, neopentyl glycol, 1,10-decanediol, cyclohexanedimethanol, and similar substances. Ethylene glycol and 2-methyl-1,3-propanediol are preferably used.

The copolyesters can be prepared via known polymerization techniques. The procedure is generally that the acid components are combined with glycol and heated in the presence of an esterification catalyst, with subsequent addition of a polycondensation catalyst.

This system should comprise an amount of at least 5 mol % of the monomers which form component B, in order that the primer is water-dispersible. The amount of monomers of component B is preferably from about 6.5 to 15 mol %. The amount of the glycol component present is approximately stoichiometric.

Other features of the sulfopolyesters suitable for the purposes of this invention are that their acid number is below 10, preferably from 0 to 3, their average molecular weight is below about 50 000 and their RV value (relative viscosity, measured by a Ubbelohde capillary viscometer on a 1% strength solution in dichloroacetic acid at 25° C.) is in the range from about 30 to 700, preferably from about 350 to 650.

Surfactants are molecules comprised of a hydrophobic and of a hydrophilic moiety, and described by the term amphiphilic.

The concentration used of the surfactant mentioned in the coating composition described above is preferably from 0.1 to 2.5% by weight, in particular from 0.3 to 2% by weight, and it is preferably an ionic, particularly preferably an anionic, surfactant, and it is particularly preferably selected from the group of the alkyl sulfates, alkylbenzenesulfonates, alkyl ether sulfates, or sulfosuccinic esters. Examples of these surfactants are sodium lauryl sulfate, sodium dodecylbenzenesulfonate, and sodium dioctyl sulfosuccinate. The % by weight value is based on the finished coating mixture.

The polymers which improve the coupling of the abovementioned components to the polyester surface are preferably used in the form of an aqueous solution or dispersion. The concentration in the finished coating solution is preferably from 0.3 to 4% by weight, in particular from 0.5 to 3.5% by weight. Examples of suitable polymers of this type are acrylates as described by way of example in WO 94/13476, polyurethanes, butadiene copolymers with acrylonitrile or methyl methacrylate, methacrylic acid, or ester thereof.

The acrylates are preferably comprised of an ester of methacrylic acid, in particular of an alkyl ester whose alkyl group comprises up to ten carbon atoms, examples being the methyl, ethyl, n-propyl, isopropyl, n-butyl, isobutyl, tert-butyl, hexyl, 2-ethylhexyl, heptyl, and n-octyl group. Acrylic copolymers derived from a lower alkyl acrylate (C1-C4), in particular ethyl acrylate, together with a lower alkyl methacrylate, give particularly good adhesion to the polyester film. It is moreover preferable to use suitable comonomers, e.g. N-methylolacrylamide, N-methylolmethacrylamide, and the corresponding ethers; monomers containing carboxy groups, e.g. crotonic acid, itaconic acid, maleic acid, or acrylic acid; anyhydrides, e.g. maleic anhydride or itaconic anhydride; monomers containing hydroxy groups, e.g. allyl alcohol and hydroxyethyl or hydroxypropyl acrylate or the corresponding methacylates, and amides, e.g. acrylamide, methacrylamide, or maleimide. These acrylate copolymers give particularly good adhesion between the polyester film and the inventive coating.

The coating can optionally comprise antiblocking agents. Conventional antiblocking agents are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, titanium dioxide, kaolin, or crosslinked polystyrene particles or crosslinked acrylate particles. Preference is given to porous $SiO_2$, for example amorphous silica, since this promotes distribution of water on the surface of the film.

The finished coating mixture, finished coating solution, or finished coating dispersion is therefore preferably comprised only of water and of components a) and b) or a), b), and c), and also, if appropriate, of antiblocking agents. "Comprised" here means that the composition is comprised of at least 90% by weight of the components mentioned, preferably at least 95% by weight, and particularly preferably at least 99% by weight.

After the in-line coating process, the coating is comprised of the dried residue (product of drying) of the coating composition, which then is likewise preferably comprised only of the product of drying of components a) and b) or a), b), and c), and also, if appropriate, of antiblocking agents.

The finished coating composition (e.g. aqueous dispersion) is likewise provided by the present invention.

The inventive biaxially oriented polyester film is preferably in-line coated, i.e. the coating is applied during the film production process prior to the longitudinal and/or transverse stretching process. In order to achieve good wetting of the polyester film by the aqueous coating composition, the surface is preferably first corona-treated. The coating can be applied by a commonly used suitable process, for example with a slot coater, or by a spray process. It is particularly preferable to apply the coating by the reverse gravure-roll process, which can apply an extremely homogeneous coating with application weights of from 1.0 to 3.0 $g/m^2$. Preference is likewise given to application via the Meyer rod process, which can achieve relatively high coating thicknesses. The thickness of the coating on the finished film is preferably from 5 to 500 nm, in particular from 30 to 200 nm.

During the drying and orientation of the polyester film, and particularly during the subsequent heat treatment, which can reach temperatures up to 240° C., the coating components can react with one another. The reaction product provides, specifically on a biaxially oriented polyester film, good antifog action and a high level of hydrophilic properties.

The structure of the inventive polyester film can have either one layer or two layers comprised of a base layer (B) and of an outer layer (A), or else three layers comprised of a base layer (B) and of two outer layers (A) and (C), which can be identical or different.

The total thickness of the polyester film is usually in the range from 5 to 500 μm, preferably from 10 to 350 μm.

The polyester film can have an inventive coating on one or both surfaces.

The polyester film can be transparent, white, opaque, glossy, or matt. These various optical properties are achieved by way of example via addition of different amounts of additives, such as calcium carbonate, amorphous silica, or titanium dioxide. These additives can be present either in the base layer or else in any outer layers present.

The polyester film can moreover be sealable and peelable. This is usually achieved via use of polyesters with low glass transition temperature or of other sealable polymers in at least one outer layer. It is preferable that a hydrophilic coating is applied to the sealable layer in these films.

The structure of the polyester film is primarily comprised of thermoplastic polyester. These polyesters are mentioned in Handbook of Thermoplastic Polyesters, ed. S. Fakirov, Wiley-VCH, 2002. Examples are polyesters comprised of ethylene glycol and terephthalic acid (=polyethylene terephthalate, PET), comprised of ethylene glycol and naphthalene-2,6-dicarboxylic acid (=polyethylene 2,6-naphthalate, PEN), or else comprised of 1,4-bishydroxymethylcyclohexane and terephthalic acid [=poly(1,4-cyclohexanedimethylene terephthalate), PCDT]. PET is particularly preferred.

The production process for polyester films is described by way of example in Handbook of Thermoplastic Polyesters, ed. S. Fakirov, Wiley-VCH, 2002, or in the chapter Polyesters, Films in the Encyclopedia of Polymer Science and Engineering, Vol. 12, John Wiley & Sons, 1988. In the preferred extrusion process for production of the film, the molten polymer material, if appropriate with the additives, is extruded via a flat-film die and quenched in the form of a substantially amorphous prefilm on a chill roll. This film is then reheated and oriented in at least one direction—either in machine direction (MD) or transverse direction (TD)—but preferably longitudinally and transversely or transversely and longitudinally or longitudinally, transversely, and again longitudinally and/or transversely. The film temperatures in the stretching process are generally above the glass transition temperature Tg of the polymer used by from 10 to 60° C., the longitudinal stretching ratio is usually from 2.0 to 6.0, in particular from 3.0 to 4.5, the transverse stretching ratio is usually from 2.0 to 5.0, in particular from 3.0 to 4.5, and the ratio for any second longitudinal and transverse stretching carried out is usually from 1.1 to 5.0. The longitudinal stretching process can also be carried out simultaneously with the transverse stretching process (simultaneous stretching), or in any conceivable sequence. The heat-setting of the film follows at oven temperatures of from 180 to 260° C., in particular from 220 to 250° C. The film is then cooled and wound.

The table below restates the most important preferred properties of the coating.

TABLE

| Coating components | preferred | particularly preferred | Unit |
|---|---|---|---|
| Sulfopolyester, proportion | 0.1–2.5 | 0.3–2.0 | % by weight |
| Surfactant, proportion | 0.1–2.5 | 0.3–2.0 | % by weight |
| Optional polymer, proportion | 0.3–4.0 | 0.5–3.5 | % by weight |
| Thickness of coating | 5–500 | 30–200 | nm |

The data are based on the ready-to-use aqueous coating composition (aqueous coating dispersion).

The inventive coating composition is suitable for the coating of polymeric surfaces, e.g. of polymer films, in particular of polyester films, of polymeric spectacle lenses, or of means of medical diagnosis. Coated polymer films or coated polyester films are suitable by virtue of their antifog properties by way of example as packaging materials for foods and for other consumable items.

In order to test the effectiveness of the coatings, polyester films were coated and characterized by the following test methods:

Contact Angle Measurement

The contact angle α with respect to water (see FIG. 1) was measured and utilized as a measure of the level of hydrophilic properties of the film surface. The smaller the contact angle, the greater the level of hydrophilic properties. The measurement was carried out on a G1 goniometer from Krüss, Hamburg, DE.

Determination of Antifog Action

The antifog properties of the polyester films were determined as follows:

Film samples were welded onto a fast-food tray (length about 17 cm, width about 12 cm, height about 3 cm) comprised of amorphous polyethylene terephthalate and comprising about 50 ml of water, in a laboratory temperature-controlled to 23° C. with 50% relative humidity.

The trays were stored in a refrigerator temperature-controlled to 4° C. and removed for assessment after, respectively, 10 min, 30 min, 4 h, 8 h, and 24 h. The test assessed condensation resulting when air at 23° C. was cooled to refrigerator temperature. A film equipped with effective antifog agent is transparent even after condensation has occurred, since, for example, the condensate forms a coherent, transparent film. Without effective antifog agent, formation of a fine mist of droplets on the film surface leads to reduced transparency of the film; in the most disadvantageous case the contents of the fast-food tray become invisible.

Another test method is known as the hot-fog test. For this, a 250 ml glass beaker containing 50 ml of water and covered by the film to be tested is placed in a water bath temperature-controlled to 70° C. The assessment is identical with that described above. In addition, this test can test long-term antifog action and, respectively, leaching resistance of the film, since steam continuously condenses on the film and then runs off or drips off. The result is leaching of readily soluble substances and decreased antifog action. This test is likewise carried out in a laboratory temperature-controlled to 23° C. with 50% relative humidity.

Measurement of Transparency and Haze

An XL-211 Hazegard Hazemeter from BYK Gardner is used for the measurement on the coated polyester films by a method based on ASTM D1033-77 for transparency and by a method based on ASTM D1003-61 for haze.

Examples are used below for further illustration of the invention.

Inventive Example 1

The following components were dissolved in water to produce the coating solution:

1.5% by weight of sulfopolyester (copolyester of 90 mol % of isophthalic acid and 10 mol % of the sodium salt of sulfoisophthalic acid and ethylene glycol), 1.5% by weight of the sodium salt of diethylhexyl sulfosuccinate (LUTENSIT® A-BO, BASF, AG) as surfactant The % by weight data are based on the finished coating solution.

This coating solution was applied to the polyester film by the following process:

A melt was produced from polyethylene terephthalate and was extruded via a flat-film die onto a casting roll kept at about 20° C., where it solidified to give an unoriented film. The unoriented film was longitudinally stretched with a stretching ratio of 3.8:1, being kept at a temperature of 115° C. The longitudinally stretched film was corona-treated in a corona discharge device and then coated via reverse gravure coating with the solution described above comprised of sulfopolyester and the sodium salt of diethylhexyl sulfosuccinate. The longitudinally stretched, corona-treated film was dried at a temperature of 100° C. The film was then transversely stretched with a stretching ratio of 3.8:1, thus giving a biaxially stretched film. The biaxially stretched film was heat-set at 230° C. The final film thickness was 25 μm. The dry weight of the coating was about 0.04 g/m².

The film exhibited very good antifog properties, i.e. no formation of fine droplets was observed. The contact angle measured was 12°, contrasting with an uncoated film whose angle was 64°. The transparency and the haze of the film remained unaltered during the antifog test.

Inventive Example 2

By analogy with Inventive Example 1, the following composition of the coating solution was used:

1.0% by weight of sulfopolyester (copolyester of 90 mol % of isophthalic acid and 10 mol % of the sodium salt of sulfoisophthalic acid and ethylene glycol), 1.0% by weight of acrylate copolymer, comprised of 60% by weight of methyl methacrylate, 35% by weight of ethyl acrylate, and 5% by weight of N-methylolacrylamide, 1.5% by weight of the sodium salt of diethylhexyl sulfosuccinate (LUTENSIT® A-BO, BASF AG)

The dry weight of the coating was about 0.04 g/m², the thickness of the backing film being about 50 μm.

As in Inventive Example 1, this film also exhibited very good antifog properties, and at the same time the leaching resistance of the coating had been improved, i.e. the antifog properties were retained even after a plurality of hours of treatment with steam. The contact angle measured was 13°. The transparency and the haze of the film remained unaltered during the antifog test.

Comparative Example

By analogy with Inventive Example 1, a biaxially oriented polyester film was produced, but without coating.

In the antifog test, the film exhibited marked formation of droplets, i.e. the film had no antifog effect. The contact angle measured was 64°.

The invention claimed is:

1. A polyester film comprising a hydrophilic coating on at least one surface, said hydrophilic coating comprising a dried coating composition, wherein said coating composition comprises water, a sulfopolyester in an amount ranging from 0.1 to 2.5% by weight, based on the weight of the coating composition, a surfactant in an amount ranging from 0.1 to 2.5% by weight, based on the weight of the coating composition and an adhesion-promoting polymer in an amount ranging from 0.3 to 4% by weight, based on the weight of the coating composition, wherein the adhesion-promoting polymer is an acrylate, polyurethane, butadiene copolymer with acrylonitrile or methyl methacrylate, methacrylic acid, or ester thereof.

2. The polyester film as claimed in claim 1, wherein the sulfopolyester is comprised of the condensate of the following monomers or their derivatives capable of forming polyesters A) up to 95 mol % of isophthalic acid, B) from 5 to 20 mol % of at least one sulfomonomer containing an alkali metal sulfonate group on the aromatic moiety of an aromatic dicarboxylic acid, and C) the necessary stoichiometric amount of at least one copolymerizable aliphatic or cycloaliphatic glycol having from 2 to 11 carbon atoms to form 100 mol % of condensate.

3. The polyester film as claimed in claim 2, wherein the sulfomonomer is the sodium salt of sulfoterephthalic acid or the sodium salt of 5-sulfoisophthalic acid.

4. The polyester film as claimed in claim 2, wherein the copolymerizable glycol is ethylene glycol.

5. The polyester film as claimed in claim 2, wherein the sulfopolyester contains from 6.5 to 12 mol % of at least one sulfomonomer.

6. The polyester film as claimed in claim 1, wherein the surfactant is an anionic surfactant.

7. The polyester film as claimed in claim 1, wherein the surfactant is an alkyl sulfate, alkyl benzene sulfate, alkyl ether sulfate, or a sulfosuccinic ester.

8. The polyester film as claimed in claim 1, wherein the adhesion-promoting polymer comprises a $C_1$-$C_{10}$-alkyl ester of methacrylic acid.

9. The polyester film as claimed in claim 1, wherein the coating composition comprises antiblocking agent.

10. The polyester film as claimed in claim 1, wherein the thickness of the coating is from 5 to 500 nm.

11. The polyester film as claimed in claim 1, wherein the film has one layer.

12. The polyester film as claimed in claim 1, wherein the layer structure of the film is A-B-C, where B is the base layer and A and C are outer layers which can be identical or different.

13. The polyester film as claimed in claim 1, which comprises polyethylene terephthalate as polyester.

14. A process for production of the polyester film as claimed in claim 1, encompassing the steps of a) producing a film via extrusion or coextrusion, b) stretching the film, c) coating the film with the coating composition, and d) heat-setting the stretched and coated film.

15. The process as claimed in claim 14, wherein the film surface to be coated is corona-treated prior to the coating process.

16. The process as claimed in claim 14, wherein the coating is applied in-line by the reverse gravure-roll coating process.

17. Packaging material for foods and other consumable items comprising polyester film as claimed in claim 1.

18. An antifogging polymeric surface comprising a dried hydrophilic coating formed from a hydrophilic coating composition comprising water, a sulfopolyester, and a single surfactant consisting of ionic surfactant, wherein the surfactant is present in an amount ranging from 1.5 to 2.5% by weight, based on the weight of the coating composition and the sulfopolyester is present in an amount ranging from 0.1 to 1.5% by weight, based on the weight of the coating composition, and the haze of the coated polymeric surface remains unaltered for 24 hours of antifog testing at 4° C.

19. An antifogging polymeric surface as claimed in claim 18, wherein said polymeric surface is polyester film and the surfactant is present in a 1:1 weight ratio in comparison to the sulfopolyester.

20. An antifogging polymeric surface as claimed in claim 18, wherein said hydrophilic coating composition further comprises an adhesion-promoting polymer.

21. An antifogging polymeric surface as claimed in claim 18, wherein said polymeric surface is a polyester film and said coating is present on both sides of said film.

22. Polymeric surfaces comprising a hydrophilic coating comprising sulfopolyester in an amount ranging from 0.1 to 2.5% by weight, based on the weight of the undried coating, surfactant in an amount ranging from 0.1 to 2.5% by weight, based on the weight of the undried coating, and adhesion-promoting polymer in an amount ranging from 0.3 to 3.5% by weight, based on the weight of the undried coating, wherein the adhesion-promoting polymer is an acrylate, polyurethane, butadiene copolymer with acrylonitrile or methyl methacrylate, methacrylic acid, or ester thereof.

23. Polymeric spectacle lenses or medical diagnosis means comprising a hydrophilic coating comprising sulfopolyester in an amount ranging from 0.1 to 2.5% by weight, based on the weight of the undried coating, surfactant in an amount ranging from 0.1 to 2.5% by weight, based on the weight of the undried coating, and adhesion-promoting polymer in an amount ranging from 0.3 to 3.5% by weight, based on the weight of the undried coating, wherein the adhesion-promoting polymer is an acrylate, polyurethane, butadiene copolymer with acrylonitrile or methyl methacrylate, methacrylic acid, or ester thereof.

24. An antifogging polyester film comprising a hydrophilic coating on at least one surface, said hydrophilic coating comprising sulfopolyester in an amount ranging from 0.1 to 2.5% by weight, based on the weight of the undried coating composition, surfactant in an amount ranging from 0.1 to 2.5% by weight, based on the weight of the undried coating composition, and adhesion-promoting polymer selected from acrylate, polyurethane, butadiene copolymer with acrylonitrile or methyl methacrylate, methacrylic acid, or ester thereof.

* * * * *